United States Patent Office 3,679,376
Patented July 25, 1972

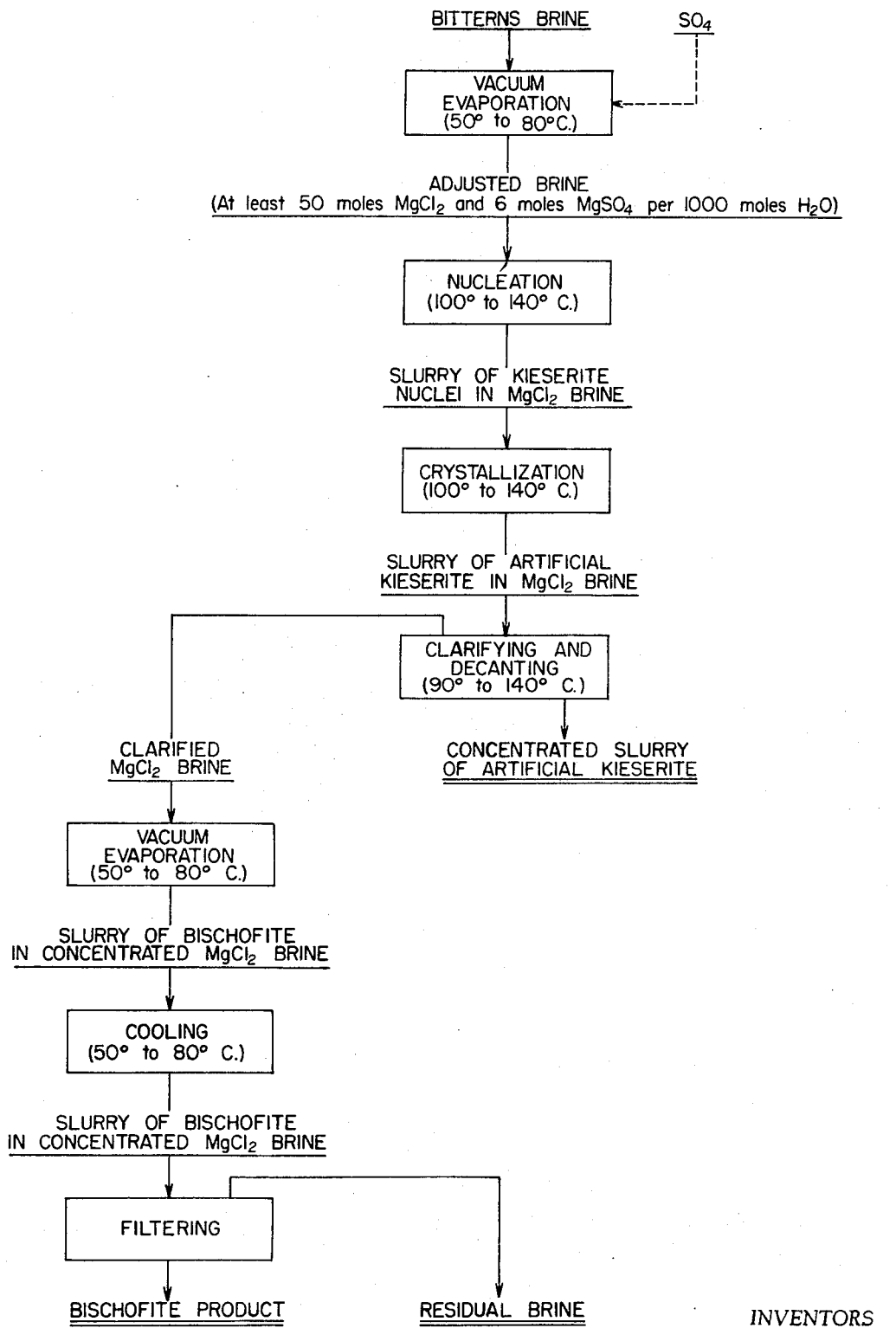

3,679,376
PROCESS FOR REMOVING SULFATE FROM MAGNESIUM CHLORIDE BRINES CONTAMINATED THEREWITH
Hans Gerhard Flint and Ulrich E. G. Neitzel, Ogden, Utah, assignors to Great Salt Lake Minerals and Chemicals Corporation, Ogden, Utah
Filed Oct. 17, 1969, Ser. No. 867,336
Int. Cl. B01d 9/02; C01f 5/30, 5/40
U.S. Cl. 23—304
9 Claims

ABSTRACT OF THE DISCLOSURE

Magnesium chloride brines containing at least about 50 moles $MgCl_2$ and at least about 6 moles $MgSO_4$ per 1000 moles $H_2O$ are heated rapidly to temperatures above about 100° C. to cause the formation of a substantial quantity of artificial kieserite nuclei. The resulting slurry is held at high temperature (about 130° C.) until substantially all of the metastable sulfate in solution has crystallized therefrom.

BACKGROUND OF THE INVENTION

Field

This invention relates to the removal of sulfate impurities from magnesium chloride brines. Specifically, it provides a method for producing substantially pure hydrated magnesium chloride from brines which initially carry substantial concentrations of sulfate impurities.

State of the art

It is known to evaporate brines which contain both magnesium chloride and magnesium sulfate, such as bitterns brines recovered from the potash, salt, or other brine industries, to recover magnesium chloride. It is further known to recover the magnesium chloride in hydrated form, such as bischofite ($MgCl_2.6H_2O$). Heretofore, bischofite obtained by the evaporation of bitterns brines contained high levels of sulfate impurities. The production of low-sulfate bischofite from brines containing even small amounts of sulfate impurities has involved complicated techniques.

Low-sulfate bischofite products have been obtained from bitterns brines by chemically treating the brine to remove sulfate impurities. Thus, for example, such brines have been treated with calcium chloride and/or barium chloride to remove sulfate prior to subjecting the brines to evaporation. An alternate procedure involves removing sulfate by first evaporating to crystallize artificial kieserite ($MgSO_4.5/4H_2O$) and then treating the hot $MgCl_2$ solution with calcium chloride and barium chloride to remove the residual sulfate. Other procedures for removing sulfate from brines include ion-exchange and solvent-extraction techniques. Each of these known techniques for removing sulfates from brine involves the use of reagents and requires special treating procedures. Thus, there remains a need for a process for producing low-sulfate magnesium chloride from sulfate-contaminated magnesium chloride brines which requires no special chemical reagents.

SUMMARY OF THE INVENTION

This invention provides a novel approach to removing sulfate from magnesium chloride brines. It has been found that for the sulfate concentration to be reduced to acceptable levels by physical processes, it is important to initially establish minimum concentrations of magnesium, chloride, and sulfate in the brine. According to this invention, the brine is treated as required to adjust its composition to the range in which kieserite is metastable, and then artificial kieserite is caused to rapidly crystallize from solution under conditions which promote the formation of a large number of nuclei in slurry with residual solution. The slurry is held at high temperatures (where the solubility of magnesium sulfate is low) for sufficient duration to permit substantially all of the metastable sulfate in solution to crystallize. By "metastable sulfate" is meant dissolved sulfate in excess of the theoretical saturated concentration of sulfate in the brine.

Any magnesium chloride brine (brine containing dissolved magnesium chloride as a principal constituent) which contains magnesium sulfate in either minor or major amounts may be processed in accordance with this invention. Practice of the invention results in a concentrated magnesium chloride brine sufficiently low in sulfate impurities that when the brine is cooled, sulfate-free magnesium chloride, usually in the form of bischofite, may be recovered. Other dissolved constituents, such as lithium, boron, potassium, and sodium, may be present in the brine, provided their concentrations are sufficiently low that unacceptable quantities are not co-precipitated as impurities with magnesium chloride. Of course, it is within contemplation that the low-sulfate brine may be useful for applications other than the precipitation of hydrated magnesium chloride.

According to the present invention, the composition of the brine being treated for sulfate removal should contain at least about 50 moles of magnesium chloride per 1000 moles of water and at least about 6 moles of magnesium sulfate per 1000 moles of water. The concentration of magnesium chloride in the brine may greatly exceed this minimum concentration; in fact, the invention is applicable to brines saturated with respect to magnesium chloride (even when such saturated brines comprise the aqueous phase of a slurry of magnesium chloride crystal species, such as $MgCl_2.6H_2O$). Similarly, the concentration of magnesium sulfate in the brine may greatly exceed the minimum concentration of about 6 moles per 1000 moles of water; it will usually exceed about 10 moles per 1000 moles of water. It is preferred, however, that substantially all of the magnesium sulfate remain in solution during the initial procedure of the invention; i.e., until it is desired to generate seed nuclei to promote the crystallization of artificial kieserite. To this end, any procedures for adjusting the concentrations of either magnesium chloride or magnesium sulfate should be done at low temperatures to avoid the premature formation of artificial kieserite nuclei. Such procedures, whether they involve evaporation or the addition of magnesium sulfate and/or magnesium chloride, are desirably accomplished at temperatures below about 85° C., preferably below about 70° C.

A magnesium chloride brine of the aforedescribed composition, either as received or after appropriate treatment to adjust its composition to the desired range, is rapidly heated to cause the formation of a substantial quantity of artificial kieserite nuclei. According to some embodiments, the rapid heating may be done in conjunction with evaporation, particularly when the initial concentrations of either or both magnesium chloride and magnesium sulfate are less than the aforedescribed minimums. It has been found that adequate kieserite nucleantion occurs at temperatures above 100° C. Any convenient higher temperature up to the boiling point of the brine (under the temperature and pressure conditions selected in a given instance) may be selected for this nucleation step of the invention.

After a substantial quantity of kieserite nuclei has been established in slurry with the brine, the slurry is held at high temperatures to promote crystallization of artificial kieserite. Temperatures above the nucleation temperature, preferably at or near the boiling point of the brine, are ideal for the crystallization step of the process. In situations where nucleation is promoted at very high temperatures; for example, in conjunction with evaporation, the crystallization procedure may rely upon somewhat lower holding temperatures. In any event, the crystallization procedure usually involves holding the slurry of kieserite nuclei in brine at temperatures above about 100° C., rarely below about 120° C., and usually at or near its boiling point under the pressure conditions established in the holding vessel (crystallizer). At these high temperatures, the solubility of magnesium chloride in the aqueous phase of the slurry is increased. It is within contemplation that the brine be evaporatively concentrated during the holding procedure. Thus, it may become or remain saturated with respect to magnesium chloride if desired. Accordingly, some magnesium chloride may be included in the solid phase of the slurry.

According to the preferred embodiments of this invention, the temperature and water content of the brine during the holding (kieserite crystallization) procedure are maintained sufficiently high to avoid the crystallization of magnesium chloride. Accordingly, the holding procedure is preferably conducted under non-concentrating conditions; that is, under conditions in which the aqueous phase of the slurry retains substantially all of its water content. When boiling temperatures are employed, refluxing may be relied upon to maintain such conditions. Alternatively, the brine may be held, in either an open or pressurized vessel, at a temperature near but below its boiling point (at the pressure maintained in the vessel) to avoid the discharge of vapors to the atmosphere.

Because the rate of crystallization of artificial kieserite increases at higher brine temperatures, it may be preferred in particular instances to hold the brine at elevated (above ambient) temperature and pressure. If the brine is relatively unconcentrated with respect to magnesium chloride when it is introduced to the holding procedure, it is sometimes useful to permit evaporation until the brine becomes concentrated with respect to magnesium chloride.

In general, the longer the brine is held at elevated temperature, the more complete will be the crystallization of artificial kieserite therefrom. As a practical matter, it is rarely economically justifiable to hold the brine for the full residence time required to complete the crystallization. It has been found, however, that completion of the crystallization is unnecessary for the production of low-sulfate hydrated magnesium chloride. Good bischlofite crystal product is obtainable by cooling concentrated magnesium chloride brines which are still supersaturated with magnesium sulfate. For purposes of this invention, it is normally sufficient to retain (hold) the brine at high temperature until the concentration of $MgSO_4$ in the brine is less that about 4 moles per 1000 moles $H_2O$. Further reduction of $MgSO_4$ concentrations to less than about 3 moles per 1000 moles $H_2O$ are preferred. Under reflux boiling at ambient pressure, holding times of about 1 to about 3 hours are usually adequate for sulfate removal from the brine. Residence times of less than about ½ hour are seldom satisfactory.

The residual magnesium chloride brine is separated from the solid phase of the slurry by any suitable technique. Because artificial kieserite crystals are very fine in size, clarification and decantation are usually most convenient. The temperature of clarification is preferably sufficiently high to avoid crystallization of magnesium chloride.

The hot-clarified magnesium chloride brine may be treated in a variety of ways to produce acceptable crystal crops of hydrated magnesium chloride. Various combinations of cooling and evaporation may be employed to obtain low-sulfate bischofite products from brine which is still supersaturated with respect to magnesium sulfate. To produce a good product, however, it is effective to conduct the evaporation at a temperature sufficiently low and at a rate sufficiently high to avoid crystallization of magnesium sulfate. The evaporation may be conducted under vacuum at a temperature lower than about 90° C., preferably below about 80° C., and rarely above 100° C. Evaporation may be continued until the solubility limit of magnesium chloride in the brine is exceeded or it may be discontinued prior to the formation of a crystal crop. It is sometimes advantageous to first evaporate under vacuum to obtain in a saturated $MgCl_2$ brine, which may contain crystallized bischofite, and then cool the brine to obtain a crystal crop. The depleted brine is then again subjected to vacuum evaporation, preferably at lower temperatures, and is again cooled to obtain a second crystal crop. In this fashion, bischofite recovery is accomplished at reduced average temperatures and at higher rates, thereby discouraging the concurrent crystallization of magnesium sulfate minerals.

Recovery of the bischofite ($MgCl_2 \cdot 6H_2O$) from the residual brine may be effected by any convenient physical separation procedure. Filtration is normally convenient, for example.

DESCRIPTION OF THE DRAWING

The single figure of the drawing is a flowsheet illustrating what is presently regarded as the best mode for carrying out the invention.

DESCRIPTION OF THE ILLUSTRATED EMBODIMENT

As illustrated, bitterns brine, such as that produced by evaporating brines taken from the Great Salt Lake of Utah to remove substantially all of the sodium chloride and potassium values therefrom, is subjected to evaporation in an evaporation zone to concentrate the brine with respect to $MgSO_4$. The brine is evaporated at low temperatures, typically between about 50 and about 80° C. The composition of the brine is adjusted by evaporation (and optionally by the addition of sulfate values) so that it contains at least about 50 mols of $MgCl_2$ and at least about 8 moles of $MgSO_4$ per 1000 moles $H_2O$. This adjusted brine is forwarded to a nucleation zone.

Various expedients may be used rapidly to heat the adjusted brine to nucleation temperature. One suitable procedure is to maintain the residence time and temperature within the nucleation zone such that brine entering the zone undergoes a temperature increase of at least about 20, preferably between about 50 and about 100 degrees C within a short time interval; e.g., within about 1/10 and about 5 minutes, preferably within about ½ minute. The heating accomplished within the nucleation zone forces a substantial quantity of kieserite nuclei from solution. Ideally, the nucleation is accomplished under conditions which favor the rapid formation of a maximum number of individual nuclei. The aforedescribed rapid heating procedure usually produces satisfactory quantities (slurry densities in excess of about 2 percent by weight) of kieserite nuclei within the size range of about 1 to about 10 microns.

A slurry of kieserite nuclei in concentrated magnesium chloride brine is recovered from the nucleation zone and is held in a crystallization zone at temperatures between about 100 and about 140° C. for sufficient duration to permit substantial crystallization of the metastable kieserite from solution. The resulting slurry of artificial kieserite in $MgCl_2$ brine is clarified and decanted at about 90 to about 140° C. to produce a clarified magnesium chloride brine. Such a brine may be saturated with magnesium chloride and typically contains less than about 4 moles of magnesium sulfate per 1000 moles of water. The clarified brine may itself be a product of commerce or it may be treated by vacuum evaporation and cooling steps, as shown, to produce a slurry of substantially sulfate-free bischofite in concentrated magnesium chloride brine. This slurry may be filtered to recover a bischofite product containing less than about 500 parts per million by weight $MgSO_4$.

Although this disclosure makes particular reference to details of certain specific embodiments, it is not intended to thereby limit the scope of the claims which themselves recite those features regarded as essential to the invention.

We claim:
1. A method for removing sulfate impurities from magnesium chloride brines containing dissolved sulfate therein which comprises:
   adjusting the composition of such a brine to contain at least about 50 moles $MgCl_2$ and at least about 6 moles $MgSO_4$ per 1000 moles $H_2O$;
   rapidly increasing the temperature of said brine to cause the formation of a substantial quantity of artificial kieserite nuclei;
   holding said brine in contact with said artificial kieserite nuclei at elevated temperatures until the concentration of $MgSO_4$ in solution is substantially reduced; and
   separating the magnesium chloride brine from the artificial kieserite crystal crop.

2. A method according to claim 1, wherein the nucleation of artificial kieserite is caused by rapidly increasing the temperature of the brine from below about 100° C.

3. A method according to claim 2, wherein the slurry of magnesium chloride brine with kieserite nuclei is held at temperatures between about 100° C. to about 140° C. to promote the crystallization of an artificial kieserite crystal crop.

4. A method according to claim 1, wherein the concentration of $MgSO_4$ in the brine is adjusted to above about 10 moles per 1000 moles of water at temperatures below about 85° C.; the brine is increased in temperature by about 20 to about 100° C. within about 1/10 to about 5 minutes to promote the formation of artificial kieserite nuclei; and said brine is held in contact with said nuclei at temperatures above about 120° C. until the concentration of $MgSO_4$ therein is reduced to less than about 4 moles per 1000 moles of water.

5. A method for removing sulfate from brines containing at least about 50 moles of $MgCl_2$ and at least about 6 moles of $MgCl_2$ per 1000 moles $H_2O$ which comprises:
   rapidly heating said brine at least about 20° C. to a temperature above about 100° C. to form a slurry of artificial kieserite nuclei in magnesium chloride brine;
   holding said slurry at a temperature above about 100° C. until the $MgSO_4$ concentration in the aqueous phase is reduced to below about 4 moles per 1000 moles $H_2O$; and
   separating said aqueous phase from said slurry.

6. A method according to claim 5, wherein the brine is rapidly heated from below about 85° C. to above about 100° C. and is then held at a temperature above about 120° C. until the $MgSO_4$ concentration is reduced to below about 3 moles per 1000 moles $H_2O$.

7. A method according to claim 6, wherein the initial heating to said temperature above about 100° C. is effected within about 5 minutes.

8. A method according to claim 6, wherein the initial heating is effected within about ½ minute.

9. A method according to claim 7, wherein the initial brine is rapidly heated to increase its temperature by about 50 to about 100° C. within about ½ minute.

References Cited
UNITED STATES PATENTS

| | | | |
|---|---|---|---|
| 2,437,182 | 3/1948 | Barr et al. | 23—304 |
| 2,479,001 | 8/1949 | Burke et al. | 23—304 |
| 3,499,725 | 3/1970 | Scarfi et al. | 23—304 |

OTHER REFERENCES

Mellor, Comprehensive Treatise on Inorganic and Theor. Chem., vol. 4, pp. 298–307, 320–25 (1923).

NORMAN YUDKOFF, Primary Examiner

R. T. FOSTER, Assistant Examiner

U.S. Cl. X.R.

23—296